(12) United States Patent
Schmalz et al.

(10) Patent No.: US 6,364,299 B1
(45) Date of Patent: Apr. 2, 2002

(54) VACUUM HOLDING APPARATUS

(75) Inventors: Kurt Schmalz; Wolfgang Schmalz, both of Dornstetten; Thomas Eisele, Fluorn-Winzeln; Ralf Stockburger, Glatten, all of (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 09/606,520

(22) Filed: Jun. 29, 2000

(30) Foreign Application Priority Data

Jul. 9, 1999 (DE) ..................................... 299 11 761 U
Aug. 10, 1999 (DE) ......................................... 199 37 801

(51) Int. Cl.⁷ ................................................ B25B 11/00
(52) U.S. Cl. ........................................... 269/21; 269/75
(58) Field of Search ............................... 269/21, 20, 75

(56) References Cited

U.S. PATENT DOCUMENTS 4,468,854 A * 9/1984 Chou et al. .................... 269/21
6,012,711 A * 1/2000 Cipolla ......................... 269/21
6,165,232 A * 12/2000 Tieber et al. .................. 269/21
6,176,008 B1 * 1/2001 Ueoka .......................... 269/21

FOREIGN PATENT DOCUMENTS

WO    WO9920437    4/1999

\* cited by examiner

*Primary Examiner*—Derris H. Banks
*Assistant Examiner*—Lee Wilson
(74) *Attorney, Agent, or Firm*—Rader, Fishman & Grauer PLLC

(57) ABSTRACT

A vacuum holding apparatus with at least one base and a suction unit supported by the base, on which the workpiece to be held can be placed and is vacuum-held by the suction unit, wherein the suction unit has a first gripping surface on the side facing the workpiece, and a second gripping surface on the side facing the base wherein the suction unit is provided with at least one mechanical holding mechanism for attachment to the base.

12 Claims, 1 Drawing Sheet

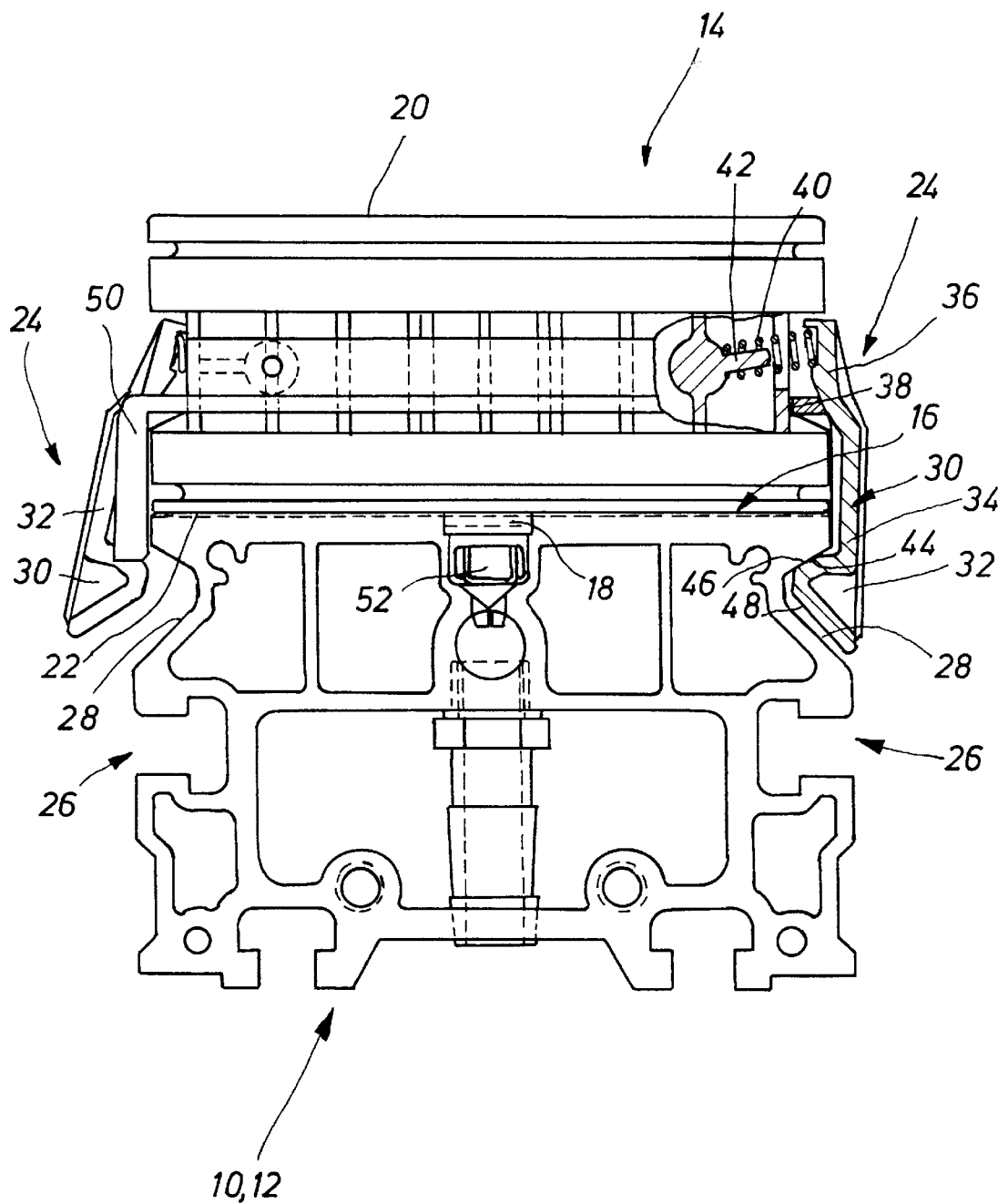

VACUUM HOLDING APPARATUS

TECHNICAL FIELD

The invention generally relates to vacuum holding apparatus and more particularly relates to vacuum holding apparatus having at least one base and a suction unit supported by the base, on which the workpiece to be held can be placed.

BACKGROUND OF THE INVENTION

Suction units are known which are connected to a vacuum source by means of a hose. Such suction units can be fastened on the base either by means of a vacuum or mechanically (e.g. fastening claws, fastening cylinders and clamping screws etc.). In the case of mechanical fastening, however, the clamping device must be able to absorb all the transverse forces. Hence, strong clamping forces are required.

A vacuum holding apparatus is known from WO 99 20 437 A1. In this vacuum holding apparatus, the base has a vacuum support on which the suction unit can be placed. If a first vacuum is applied to this vacuum connection, then the suction unit is fastened to the base via this vacuum. Onto the suction unit, a workpiece can be placed which is also held in place by means of vacuum. For this purpose, the vacuum already applied to the suction unit is increased until the pressure control valve in the suction unit opens, so that the vacuum is also present in the upper holding region facing the workpiece. The suction units can then be displaced freely on the base or placed on the base in any desired manner when no vacuum whatsoever is present at the suction unit. In particular, the use of spreader beams on which the suction unit can be displaced may lead to the disadvantage that during the use of several suction units, one or another unit may become unintentionally displaced during the positioning of the workpiece or during the positioning of other suction unit. The vacuum holding the suction unit in place can be applied only when the suction units are in the required positions. A displacement of the fastened suction unit is no longer possible.

For this reason, it is the object of the invention to make available a vacuum holding apparatus in which the suction units are held on the base by means of vacuum and the workpiece is held in place at the suction unit by means of vacuum, as in the prior art, but the suction unit, while being positioned on the base, has a certain protection against displacement even when vacuum has not yet been applied.

This task is accomplished in accordance with the invention in that in the vacuum holding apparatus of the initially mentioned type, the suction unit is provided with at least one mechanical holding means for attachment on the base.

Due to the additional mechanical holding means, at times when no vacuum has been applied, sliding of the suction unit is prevented since it is connected to the base via the mechanical holding means. These mechanical holding means may be such that they only produce holding forces which are relatively low but sufficient for the assembly process.

In a farther embodiment, it is provided that the base is in the form of a spreader beam and has at least one longitudinal side a longitudinal groove extending in the longitudinal direction and that the holding means are in the form of locking means. With such an arrangement, the suction unit can be placed without special manipulations on the spreader beam from above and can be interlocked with it, where the locking means engage with the longitudinal groove.

Advantageously, on both longitudinal sides of the spreader beam, longitudinal grooves are located with which respective the locking means engage.

In a further embodiment, the locking means are provided with a spring-loaded rest position, wherein particularly the rest position corresponds to the locking position. This has the essential advantage that the locking can take place already upon placement of the suction unit on the base. A release of the suction unit takes place by means of a manual unlocking, i.e. by means of a manual operation of the locking means. It is also contemplated that the release of the suction unit can take place mechanically, for example, by means of a tool-changing system.

In one embodiment, the holding means is in the form of a pivotable clamping lever. Here, the clamping lever has, in particular, a holding arm that engages with the base and a guide rod opposite the pivot bearing point. The holding arm, during the placement of the suction unit on the base, is at first deflected and then locks itself into the longitudinal groove. This locking position is maintained in that the holding arm, in particular, is integrally connected to the guide rod and the guide rod is spring-loaded. By means of an appropriate selection of the lever conditions of the holding arm and the guide rod, the holding forces can be optimized. The spring may be in the form of a compression spring, leg spring or synthetic spring.

A simple sliding of the suction unit onto the base and thereby a problem-free deflection of the holding arm from the rest position is achieved in that the holding arm has a load ramp. The holding arm is deflected across this load ramp and, upon placement of the suction unit on the base, locks into the desired locked position, in which a load catch engages with the longitudinal groove.

Preferably, the clamping lever is attached by way of a hinge at the suction unit. This hinge makes possible a problem-free deflection of the clamping lever, wherein the hinge may be in the form of a film hinge. In one example, the clamping lever is injection-molded onto the suction unit.

In a preferred embodiment, the two gripping surfaces are connected to each other with a pressure-control valve, wherein a vacuum can be applied to the second gripping surface and the pressure-control valve opens at a certain vacuum. This suction unit may be held mechanically prior to being held by means of vacuum.

BRIEF DESCRIPTION OF THE DRAWING

FIG. 1 is a front elevational, partial cross-sectional view of the vacuum holding apparatus of the present invention.

DETAILED DESCRIPTION OF THE PREFERRED EMBODIMENTS

In the drawing, reference numeral (10) represents a base in the form of a spreader beam (12) and reference numeral (14) represents a suction unit. The base has an upper gripping surface (16) onto which the suction unit (14) can be placed and from which a vacuum connection (18) opens. The suction unit (14) has a first gripping surface (20) on which a workpiece(not shown) can be placed, and a second gripping surface (22) which the suction unit (14) is engaged on the gripping surface (16) of the base (10). The two gripping surfaces (20 and 22) have a circular seal, so that they are sealed off tightly with respect to the tool or the base (10).

Furthermore, each of the two opposing longitudinal sides of the suction unit (14) is provided with a holding means

(24) with which it can be mechanically connected to the base (10) or the spreader beam (12). For this purpose, each of the two longitudinal sides (26) of the spreader beam (12) has a longitudinal groove (28) with which a catch (30) of the holding means (24), which is in the form of a clamping lever (32), engages. The clamping lever is formed by a holding arm (34) as well as a guide rod (36), which are formed in one piece and are pivotably mounted at the base. The pivot bearing (38) is in the form of a film hinge which is injection-molded onto the suction unit (14).

The guide rod (36) is urged by spring (40) which sits on a holding pin (42). The guide rod (36) is spring-loaded by means of the spring (40), wherein the spring force acts in clockwise direction with respect to the pivot bearing (38), so that the holding arm (34), in particular the catch (30), is forced into the longitudinal groove (28).

The longitudinal groove (28) has at its upper side a ramp (44) against which the inclined surface (46) of the catch (30) rests. If the suction unit (14), placed on the base (10), is loaded either through the weight of the workpiece or is drawn onto the base upon the application of vacuum, then the position of the suction unit (14) is displaced in the direction toward the base (10) and the catch (30) slides with its inclined surface (46) along the ramp (44). Due to the inclined rest position, no release or loosening of the suction unit (14) takes place and the clamping force is maintained. In the area of the inclined surface (46), the catch (30) may also be provided with slip-proof layer.

Furthermore, the catch (30) has a ramp (48), so that the suction unit (14) can be placed on the base (10) without operating the holding means (24), wherein the load ramp (48) causes the holding means (24) to open automatically and the latches (30) can engage with the longitudinal grooves (28).

A release of the suction unit (14) from the base (10) takes place when the guide rods (36) are depressed manually against the force of the spring (40). The profiled flanges (50) grip across the holding means (24) at their front faces, wherein the profiled flanges represent a certain protection for the holding means (24).

Reference numeral (52) describes a flow valve or a solenoid.

We claim:

1. Vacuum holding apparatus, comprising:
    at least one base,
    a suction unit, directly supported by the base, onto which a workpiece to be fastened can be placed and held thereon by the means of a vacuum, wherein the suction unit includes a first gripping surface on a side facing the workpiece and a second gripping surface on a side facing the base, wherein the suction unit is provided with at least one mechanical holding means for attachment to the base,
    wherein the holding means includes clamping lever.

2. Vacuum holding apparatus in accordance with claim 1, wherein the base is in the form of a spreader beam and has a longitudinal groove in at least one longitudinal side that extends in a longitudinal direction, wherein the holding means is a locking means.

3. Vacuum holding apparatus in accordance with claim 1, wherein the holding means has a spring-loaded rest position.

4. Vacuum holding apparatus in accordance with claim 3, wherein a resting position of the holding means corresponds to the locking position.

5. Vacuum holding apparatus in accordance with claim 1, wherein the clamping lever includes a holding arm engaging the base, and includes a guide rod which is opposite a pivot bearing point.

6. Vacuum holding apparatus in accordance with claim 5, wherein the guide rod is spring-loaded.

7. Vacuum holding apparatus in accordance with claim 5, wherein the holding arm has a load ramp.

8. Vacuum holding apparatus in accordance with claim 1, wherein the clamping lever is hingedly attached to the suction unit.

9. Vacuum holding apparatus in accordance with claim 8, wherein the hinge is a film hinge.

10. Vacuum holding apparatus in accordance with claim 1, wherein the clamping lever is one piece.

11. Vacuum holding apparatus in accordance with claim 1, wherein the two gripping surfaces are connected to each other with a pressure-control valve, wherein when a vacuum is applied at the second gripping surface, the pressure-control valve opens at a predetermined vacuum level.

12. Vacuum holding apparatus, comprising:
    at least one base,
    a suction unit, directly supported by the base, onto which a workpiece to be fastened can be placed and held thereon by the means of a vacuum, wherein the suction unit includes a first gripping surface on a side facing the workpiece and a second gripping surface on a side facing the base, wherein the suction unit is provided with at least one mechanical holding means for attachment to the base,
    wherein the two gripping surfaces are connected to each other with a pressure-control valve, wherein when a vacuum is applied at the second gripping surface, the pressure-control valve opens at a predetermined vacuum level.

* * * * *